United States Patent [19]

Arnold et al.

[11] 4,349,759

[45] Sep. 14, 1982

[54] COMMUTATOR FOR ELECTRICAL MACHINES

[75] Inventors: Niklaus Arnold; Josef Schmidli, both of Baden; Peter Spiess, Zug, all of Switzerland

[73] Assignee: BBC Brown, Boveri & Company, Ltd., Baden, Switzerland

[21] Appl. No.: 859,214

[22] Filed: Dec. 9, 1977

[30] Foreign Application Priority Data

Dec. 10, 1976 [CH] Switzerland ........................ 15550/76

[51] Int. Cl.$^3$ ............................................ H02K 13/04

[52] U.S. Cl. ...................................... 310/233; 310/42

[58] Field of Search ............................... 310/233–237, 310/42, 227

[56] References Cited

U.S. PATENT DOCUMENTS

| | | | |
|---|---|---|---|
| 712,046 | 10/1902 | Dawson | 310/233 |
| 1,362,029 | 12/1920 | Mills | 310/233 |
| 2,550,574 | 4/1951 | Lynn | 310/233 |
| 3,450,914 | 6/1969 | Demerciere | 310/236 |
| 3,742,273 | 6/1973 | Heil | 310/236 |

FOREIGN PATENT DOCUMENTS

| | | | |
|---|---|---|---|
| 1207486 | 12/1965 | Fed. Rep. of Germany | 310/233 |
| 2538131 | 3/1977 | Fed. Rep. of Germany | 310/234 |

*Primary Examiner*—R. Skudy

*Attorney, Agent, or Firm*—Burns, Doane, Swecker & Mathis

[57] ABSTRACT

A commutator for electrical machines and a method of manufacture of the commutator is disclosed which consists of a lamination assembly held together by a pair of shrink-rings. One of the rings serves to support the commutator on a commutator hub and comprises first and second ring portions having between them a decoupling portion. The first ring portion is in the form of a shrink-ring and holds together the lamination assembly. The second ring portion is secured to the commutator hub. The other shrink-ring also holds together the lamination assembly. In the method of manufacture of the commutator, both the first and second ring portions are simultaneously shrunk on to the lamination assembly and commutator hub respectively.

10 Claims, 1 Drawing Figure

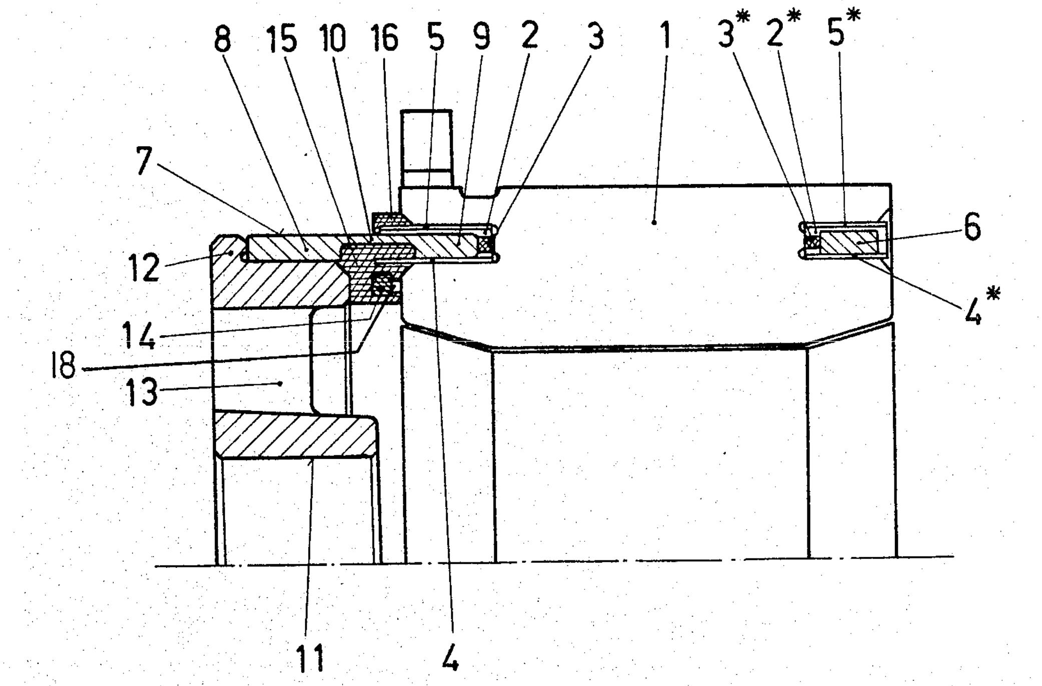
8
15
10
16
5
9
2
3
1
3*
2*
5*
7
6
12
4*
14
18
13
11
4

COMMUTATOR FOR ELECTRICAL MACHINES

BACKGROUND AND FIELD OF THE INVENTION

The present invention relates to commutators for electrical machines and to methods of manufacture of the commutators. More specifically, the invention relates to a commutator and method of manufacture in which a lamination assembly is held together by shrink rings.

In DT-OS 2 062 864 a commutator is described which consists of a lamination assembly held together by shrink-rings. The shrink-ring which serves to support the commutator comprises two rings with an elastic connecting portion. One of the rings is shrunk on to the commutator and thus serves to hold the lamination assembly together. The commutator hub is shrunk on to the other ring, which is joined to the first ring by an elastic connecting portion. This arrangement allows thermal expansion of the commutator in the axial direction and within certain limits permits changes in the radial direction, without losing a tight fit on the shaft or on the commutator hub.

Because shrink-rings have to meet exacting requirements with regards to strength, and because of the special shaping and the hardness of the material a shrink-ring for supporting a commutator is very costly to make. Also, a method of manufacture which includes the step of assembling the commutator by means of two different shrinking operations with one after the other results in long assembly times, and hence high costs. It has been attempted to make the shrink-ring and the commutator hub in one piece, but this solution does not result in a combination of low production costs and high material strength.

An object of the present invention is to provide a commutator for electrical machines which permits high mechanical stresses and is distinguished by ease of installation, and hence low production costs.

Another object of the invention is to provide a method of manufacture for the commutator for electrical machines of the present invention.

The commutator of the present invention may be manufactured by having the ring portions of the shrink ring which serves to support the commutator simultaneously shrunk on to the commutator and onto an outside surface of the commutator hub in single operation.

In other words, the chief advantage of the invention lies in providing a commutator in which both shrink-fit joints can be made in one operation.

The invention concerns a commutator and a method of manufacture of the commutator for electrical machines which consists of a lamination assembly that is held together by a pair of shrink rings. One of the shrink rings serves to support the commutator on a commutator hub and comprises first and second ring portions having between them a decoupling portion. The first ring portion holds together the lamination assembly. The second ring portion is secured to the commutator hub. The other of the two shrink rings holds together the lamination assembly.

Of particular benefit is an arrangement whereby the ring portions of the one shrink ring have essentially the same inside diameters and outside diameters. It is then possible to produce the shrink ring by rolling, in which case only slight subsequent machining is necessary and thus savings in material and time are achieved. It is of advantage to locate the decoupling portion at the outside diameter of the ring portions since with this configuration not only are material stresses during operation of the commutator greatly reduced, but also a greater resistance to sparkover is achieved by virtue of a larger insulating distance. To define the distance between commutator and commutator hub it is convenient to provide the commutator hub with a stop on the surface receiving the ring portion. It is of advantage to provide the commutator hub with air passages so as to ensure good cooling of the commutator. The shrink-rings are preferably of steel having high tensile strength, preferably $\sigma \geqq 70$ kp/mm$^2$, and the commutator hub is preferably of grey iron. A construction which is relatively inexpensive but able to withstand very high stresses is obtained in this way. To increase the resistance to sparkover it is advantageous to provide insulating material at the inside and outside of the decoupling portion. A castable, curable synthetic resin is particularly suitable as the insulating material. To reduce the volume of cast insulation it is advantageous to attach an insulating ring by way of spacers to the end surface of the commutator facing the commutator hub. The cavity between the commutator hub, the commutator and the decoupling portion is then preferably filled completely with resin.

The method of manufacturing a commutator according to the present invention is such that after the ring serving to support the commutator is heated, one ring portion is introduced into a slot in the lamination assembly and the commutator hub is then inserted into the other ring portion. Direct mechanical bonds with the lamination assembly and the commutator hub are then obtained by cooling the two ring portions simultaneously.

It is of benefit to attach the insulating ring to the end surface of the commutator facing the commutator hub before the one ring is shrunk on to the lamination assembly and the commutator hub.

It is also advantageous to fill the space between the commutator and the upper part of the commutator hub resulting from the shrinking operation with a curable synthetic resin, at least along the decoupling portion. To avoid air inclusions it is beneficial to pour the synthetic resin while the commutator is rotating.

BRIEF DESCRIPTION OF THE DRAWING

The drawing is a cross-sectional, side view through a portion of the commutator of the present invention.

DETAILED DESCRIPTION OF THE PRESENT INVENTION

With reference to the drawing a lamination assembly 1 has an annular slot 2, 2* turned in each end face of the assembly. Fixed at the base of each slot are three pieces of ceramic insulation 3, 3*, with side wall surfaces of the slots being lined with an insulating film **4, 4*, 5, 5*. The inside radius of the slot may be lined with Kapton film 4, 4* and the outside radius may be lined with a polyamide film 5, 5*. The lamination assembly 1 is held together by a first shrink-ring 6 which is located in the slot 2* and by a second shrink-ring 7. The shrink-ring 7 consists of two ring portions 8, 9 which are joined together by a decoupling portion 10 that is located at the outside radius of the ring portions 8, 9. The ring portion 9 of the shrink-ring 7 is situated in the slot 2, with the ring portion 8 being situated on a commutator hub 11**.

The commutator hub 11 has a stop 12 on the surface which receives ring portion 8. The hub is provided with air passages 13 that are arranged in the axial direction. An insulating ring 14 is attached to the end surface of the commutator 1 facing the commutator hub 11.

A space between the upper part of the commutator hub 11, the lamination assembly 1 and the decoupling portion 10 is completely filled with a curable synthetic resin 15. An insulating ring 16 adjoining the lamination assembly 1 is located on the outside of the decoupling portion 10.

The method of manufacture of the commutator of the invention with reference to the drawing, is accomplished by first turning a slot 2, 2* in each end face of the lamination assembly 1. Three pieces of ceramic insulation 3, 3* are then fixed at the base of the slot, with the side walls of the slots being lined on their inner radius with Kapton film 4, 4*. The shrink-ring 6 is heated and placed in the slot 2* so that it abuts the pieces of insulation 3*. Inside the Kapton film 4, an insulating ring 14 is stuck to the lamination assembly (to the end surface of the commutator 1 facing the commutator hub) at three points by way of spacers 18. After the shrink-ring 7 is heated, the ring portion 9 is introduced into the slot 2 until it meets the pieces of insulation 3 and the commutator hub 11 is then slid into ring portion 8 as far as stop 12. A direct mechanical bond between the inside surface of the ring 7 and both the lamination assembly 1 and the commutator hub 11 is obtained by simultaneously cooling the ring portions 8, 9. The cavities which remain in the slots 2, 2* after the application of the polyamide film 5, 5* to the outside radius of the slot side walls are filled with a curable synthetic resin. With the commutator rotating, the space between the upper part of the commutator hub 11, the lamination assembly 1 and the decoupling portion 10 is filled with castable resin which encloses both the Kapton film 4 and the insulating ring 14. An insulating body 15 is thus formed on the inside of the decoupling portion 10. A mould is also fitted on the outside of the decoupling piece 10 and is filled with curable synthetic resin, providing an insulating ring 16 which adjoins the decoupling portion 10 and lamination assembly 1.

The commutator of the invention and the method for its manufacture greatly reduce the costs of materials, production and assembly. The invention also offers the particular advantages that (a) by using shrink-rings of high tensile strength height of the copper includes in the commutator can be reduced, (b) the decoupling ring is subject to less mechanical load because both ring portions receive the same initial stress and, (c) the resistance to sparkover is increased owing to extended creepage distances and better insulation.

What we claim is:

1. A commutator for electrical machines comprising:

a lamination assembly having a first surface;

a commutator hub having a second surface;

a shrink ring having first and second portions joined together by a decoupling portion, the first ring portion having an inner surface with a diameter corresponding to the diameter of the first surface of the lamination assembly whereby the diameter of the first ring portion may be increased by heating and subsequently decreased by cooling, the second ring portion having an inner surface with a diameter corresponding to the diameter of the second surface of the commutator hub whereby the diameter of the second ring portion may be increased by heating and subsequently decreased by cooling, and the first and the second ring portions being simultaneously shrunk onto the first surface of the lamination assembly to hold together the lamination assembly and onto the second surface of the commutator hub to be joined to the commutator hub respectively.

2. A commutator as claimed in claim 1, in which the ring portions have the same general inside diameters and outside diameters.

3. A commutator as claimed in claim 2, in which the decoupling portion is located at an outside diameter of the shrink ring.

4. A commutator as claimed in claim 1, in which the commutator hub includes a stop on the surface of the hub which receives the second ring portion.

5. A commutator as claimed in claim 1, in which the commutator hub is provided with air passages.

6. A commutator as claimed in claim 1, in which the shrink-ring is of steel with high tensile strength, with $\sigma \geqq 70$ kp/mm$^2$, and the commutator hub is of grey iron.

7. A commutator as claimed in claim 1, in which insulating material is provided inside and outside of the decoupling portion.

8. A commutator as claimed in claim 7, in which the insulating material is a castable, curable synthetic resin.

9. A commutator as claimed in claim 7, further comprising an insulating ring and spacer means for attaching the insulating ring to the end surface of the lamination assembly facing the commutator hub.

10. A commutator as claimed in claim 9, in which the cavity between the commutator hub, the lamination assembly and the decoupling portion is completely filled with a castable resin.

* * * * *